United States Patent [19]

Hamilton

[11] Patent Number: 5,998,494
[45] Date of Patent: Dec. 7, 1999

[54] RIGID POLYURETHANE FOAMS

[75] Inventor: Alan James Hamilton, Leefdaal, Belgium

[73] Assignee: Imperial Chemical Industries PLC, London, United Kingdom

[21] Appl. No.: 09/085,472

[22] Filed: May 27, 1998

[30] Foreign Application Priority Data

May 29, 1997 [EP] European Pat. Off. .............. 97201588

[51] Int. Cl.$^6$ ....................................... C08J 9/04
[52] U.S. Cl. .......................... 521/166; 521/125; 521/128; 521/129; 521/130; 521/131; 521/163; 521/167; 521/170; 521/172; 521/173; 521/174
[58] Field of Search .................................. 521/125, 128, 521/129, 130, 131, 163, 166, 167, 170, 172, 173, 174

[56] References Cited

U.S. PATENT DOCUMENTS 4,049,931  9/1977  Sandner et al. .
5,578,656  11/1996  Gillis et al. .
5,730,896  3/1998  Gillis et al. .

FOREIGN PATENT DOCUMENTS 0 488 219  6/1992  European Pat. Off. .
0 498 628  8/1992  European Pat. Off. .

*Primary Examiner*—John M. Cooney, Jr.
*Attorney, Agent, or Firm*—Pillsbury Madison & Sutro Intellectual Property Group

[57] ABSTRACT

Process for the preparation of rigid open celled polyurethane foams comprising the step of reacting an organic polyisocyanate with an isocyanate-reactive material in the presence of a blowing promotor which is an isocyanate-reactive cyclic carbonate or cyclic urea, and in the presence of an aminoalcohol catalyst.

13 Claims, No Drawings

RIGID POLYURETHANE FOAMS

This invention relates to rigid polyurethane foams and more especially to open celled rigid polyurethane foams and to methods for their preparation and to their use in evacuated insulation panels.

The production of foamed materials based on polyurethane and other polymer systems derived from organic polyisocyanates is well established. Depending upon the formulations used in their manufacture, the products can vary in texture from the soft flexible foams used as cushioning materials to the rigid foams used as insulating or structural materials.

Rigid polyurethane foams can be of the closed cell type or of the open cell type. An important application of open celled rigid polyurethane foam is as filler material in evacuated insulation panels as described in European Patent Publications Nos 188806 and 498628.

In European Patent Publication No. 498628 a process for preparing open celled rigid polyurethane foam is described, said process comprising the step of reacting an organic polyisocyanate with an isocyanate-reactive material in the presence of a blowing promotor being an isocyanate-reactive cyclic compound of formula:

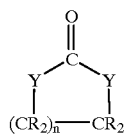

(I)

wherein

Y is O or $NR^1$ wherein each $R^1$ independently is a lower alkyl radical of $C_1$–$C_6$ or a lower alkyl radical substituted with an isocyanate-reactive group; each R independently is hydrogen, a lower alkyl radical of $C_1$–$C_6$ or $(CH_2)_m$—X wherein X is an isocyanate-reactive group which is OH or $NH_2$ and m is 0, 1 or 2; and n is 1 or 2;

with the proviso that at least one of $R^1$ or R is or comprises an isocyanate-reactive group;

and in the presence of a metal salt catalyst.

In order for such an open celled foam to be suitable as filler in evacuated insulation panels, the closed cell content of the foam must be as low as possible, preferably below 1%.

Therefore it is an object of the present invention to provide a process for preparing open celled rigid polyurethane foams with a lower closed cell content.

Accordingly the present invention provides a process for the preparation of rigid foams comprising the step of reacting an organic polyisocyanate with an isocyanate-reactive material in the presence of a blowing promotor being an isocyanate-reactive cyclic compound of formula:

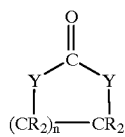

(I)

wherein

Y is O or $NR^1$ wherein each $R^1$ independently is a lower alkyl radical of $C_1$–$C_6$ or a lower alkyl radical substituted with an isocyanate-reactive group; each R independently is hydrogen, a lower alkyl radical of $C_1$–$C_6$ or $(CH_2)_m$—X wherein X is an isocyanate-reactive group which is OH or $NH_2$ and m is 0, 1 or 2; and n is 1 or 2;

with the proviso that at least one of $R^1$ or R is or comprises an isocyanate-reactive group;

wherein an aminoalcohol is used as catalyst either as such or in a blocked form.

By using an aminoalcohol as catalyst the closed cell content of the obtained foam is lower than in the case of a metal salt catalyst as in the prior art or a standard amine catalyst. When the foams are produced in block form low or zero basal voids are obtained.

Due to its lower closed cell content these foams perform better in evacuated insulation panels than the known open celled rigid foams.

By the term aminoalcohol is meant a compound which contains at least one amino group and at least one hydroxyl group.

Preferably the aminoalcohol contains one amino group, preferably a tertiary amino group, and one hydroxyl group.

The molecular weight of the aminoalcohol for use in the present invention is generally between 50 and 500 and preferably between 100 and 150.

The aminoalcohols can be used in the process of the present invention as such or in a blocked form, i.e. in the form of an amine salt with acids such as acetic acid, formic acid or phenolic acid.

Preferred aminoalcohols for use in the present invention are tertiary-dialkylamino ether monols, especially tertiary-dimethylamino ether monols. These are characterised by the presence of a tertiary-dialkylamino group, one or more ether oxygen atoms and one hydroxyl group, the said amino and hydroxyl groups being positioned beta to either a common or different acyclic ether oxygen atom. In those compounds having a plurality of ether linkages, the ether oxygen atoms are also positioned beta to one another. Overall, the amino ether monols employed have from one to five acyclic ether oxygen atoms and at least six and no more than 26 carbon atoms, no individual continuous carbon chain bonded to ether oxygen having more than four carbon atoms.

The aforesaid essential structural characteristics of the amino ether monols employed in the practice of this invention are conveniently expressed by the following general formula (II)

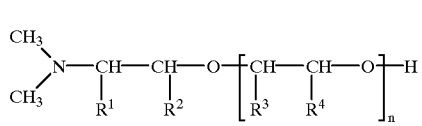

(II)

wherein $R^1$ and $R^2$ each represents hydrogen, methyl or ethyl, provided that, cumulatively, $R^1$ and $R^2$ have no more than two (carbon atoms; $R^3$ and $R^4$ each represents hydrogen, methyl or ethyl, provided that, cumulatively, $R^3$ and $R^4$ have no more than two carbon atoms; and n has an average value from one to about five. In the compounds encompassed by formula II the $R^1$, $R^2$, $R^3$ and $R^4$ groups may be the same as or different from one another. Of the compounds encompassed by formula I preferred ones are those in which $R^1$ through $R^4$ are hydrogen or methyl. Most preferably, $R^1$ through $R^4$ are hydrogen. From the standpoint of the number of ether linkages, n preferably has an average value no more than about three and is most preferably from one to about two.

Preferred tertiary-dimethylamino ether monols are 1-(2-dimethylaminoethoxy)2-propanol, 1-(l-dimethylamino-2-propoxy)2-propanol, 2-(1-dimethylamino-2-propoxy)ethanol, and particularly 2-(2-dimethylaminoethoxy)ethanol and 2-[2-(2-dimethylaminoethoxy)ethoxy]ethanol.

Another class of suitable aminoalcohol catalysts for use in the present invention are N,N-dialkylalkanolamines such as N,N-dimethylethanolamine and N,N-dimethylisopropanolamine.

Examples of preferred aminoalcohols for use in the present invention are 2-(2-dimethylaminoethoxy) ethanol, commercially available under the names Dabco DMAEE from Air Products or Texacat ZR 70 from Texaco, N,N-dimethylaminoethyl N-methyl ethanolamine, commercially available under the name Dabco T from Air Products and trimethylamino propyl ethanolamine, commercially available under the name Polycat 17 from Air Products.

The aminoalcohol is generally used in the present invention in an amount of between 0.1 and 3% by weight based on total reaction system, preferably between 0.2 and 0.9% by weight.

Optionally other types of catalyst can be used in addition to the aminoalcohol catalyst in amounts up to 25 wt % of total catalyst content, preferably between 10 and 20 wt %. Examples of these co-catalysts include urethane blow catalysts know in the art, for example, tertiary amines such as Niax A1 available from Union Carbide.

The total amount of catalyst is generally between 0.3 and 1.0% by weight based on total reaction system.

A preferred compound of formula (I) wherein Y is O is an isocyanate-reactive cyclic carbonate which is glycerol carbonate.

Preferred compounds of formula (I) wherein Y is $NR^1$ are isocyanate-reactive cyclic ureas of formula:

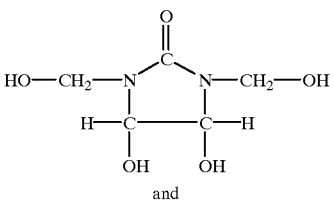

(III)

and

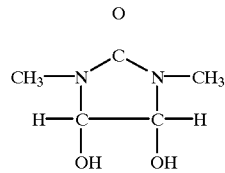

(IV)

The isocyanate-reactive cyclic blowing promotor is used in amounts ranging from 0.5 to 99%, preferably from 0.5 to 60%, most preferably from 1 to 10% by weight based on the total isocyanate-reactive material.

Suitable further blowing agents may be used in the method of the present invention such as water or inert low boiling compounds having a boiling point of above −50° C. at 1 bar.

The amount of water used as blowing agent may be selected in known manner to provide foams of the desired density, typical amounts being in the range from 0.05 to 5 parts by weight per 100 parts by weight of reactive ingredients, although it may be a particular embodiment of the present invention to incorporate up to 10% by weight or even up to 20% by weight of water.

Suitable inert blowing agents include, for example, hydrocarbons, dialkyl ethers, alkyl alkanoates, aliphatic and cycloaliphatic hydrofluorocarbons, hydrochlorofluorocarbons, chlorofluorocarbons and fluorine-containing ethers. Suitable hydrocarbon blowing agents include lower aliphatic or cyclic hydrocarbons such as n-pentane, isopentane, cyclopentane, neopentane, hexane and cyclohexane.

The partial use of liquid $CO_2$ (1 to 5 parts by weight) can be included to assist the formation of blocks with less scorch tendency due to lower foam exotherms.

In order to decrease the cell size of the foams air nucleation, as known to those skilled in the art to assist the formation of fine cells, can be used or substantially insoluble organic liquids can be added to the foam formulation.

The insolubility of the organic liquid in the reaction mixture usually arises from the fact that it is insoluble in one or more of the major ingredients of the foam formulation, especially the isocyanate-reactive material and/or the polyisocyanate. Solubility in these materials can be determined by conventional techniques.

Examples of insoluble organic liquids include fluorinated compounds, aliphatic, cycloaliphatic or aromatic hydrocarbons.

It is preferred, however, to use as insoluble organic liquid a highly fluorinated or perfluorinated compound. A highly fluorinated compound as used herein is defined as a compound wherein at least 75% and preferably at least 90% and most preferably at least 99% of the hydrogen atoms have been replaced by fluorine atoms.

Suitable highly fluorinated or perfluorinated compounds which may be used in the present invention include aliphatic or cycloaliphatic compounds such as alkanes or cycloalkanes which may be substituted or non substituted, cyclic or non cyclic compounds containing at least one O atom, which may be substituted or non substituted, such as fluorinated ethers, cyclic or non cyclic compounds containing at least one N atom, which may be substituted or non substituted, such as fluorinated amines, cyclic or non cyclic compounds containing O and N atoms, which may be substituted or non substituted, such as fluorinated hydroxyl amines or fluorinated aminoethers, cyclic or non cyclic compounds containing at least one S atom, which may be substituted or non substituted, such as fluorinated sulfones, for example $CF_3SO_2CF_3$ and $CF_3SO_2CF_2CF_3$.

Particular examples of highly fluorinated or perfluorinated hydrocarbons include: perfluoronorbornadiene, perfluorodecaline, perfluorodimethylcyclohexane, perfluoromethylcyclohexane, perfluoro-1-methyldecaline, perfluorophenantrene, perfluorodimethylcyclobutane, perfluoropentane, perfluorohexane, perfluoro(4-methylpent-2-ene), $C_9F_{19}CHF_2$, $C_8F_{18}$, $C_7F_{16}$ and their cyclic derivatives.

Particular examples of highly fluorinated or perfluorinated oxygen containing compounds include: perfluorobutyltetrahydrofuran and perfluoropropyltetrahydrofuran.

Particular examples of highly fluorinated or perfluorinated compounds containing N atoms or N atoms and O atoms include fluorine-containing tertiary amines, for example, $(CHF_2)_3N$, $CF_3N(CHF_2)_2$, $(CF_3)_2NC_2F_5$, $CF_3N(C_2F_5)_2$, $(C_2F_5)_3N$, $(CF_3)_2NCF_2CF_2H$, $CF_3CH_2N(CH_3)_2$ and N-methyloctaflouropyrolidine, fluorine-containing hydrazines, for example, $(CF_3)_2NN(CF_3)_2$, or $(CF_3)_2NOCH_3$, $(CF_3)_2NOC_2F_5$, $CF_3NOCF_2CF_2$ and $(CF_3)_2NOCF_2C$ $(CF_3)$ FON $(CF_3)_2$ and fluorine-containing amino-ethers, for example $(CF_3)_2NCF_2CF_2OCF_3$ and most preferably perfluoro-N-methylmorpholine, perfluorotripentylamine, perfluorotributylamine, perfluorotripropylamine, perfluoro-N-methylpiperidine.

Other suitable fluorinated compounds include the perfluorinated ethers commercialised by Montefluos S.p.A. as Galden HT 200, Galden HT 230, Galden HT 250 and Galden HT 270 (Galden is a trademark).

To ensure zero ozone depletion potential, it is preferred to use fluorinated compounds containing no other halogen atoms.

The insoluble organic liquid is used in the process of the present invention in amounts ranging from 0.05 to 5% by weight based on the total reaction system.

The substantially insoluble organic liquid will usually be incorporated in the foam-forming reaction mixture in the form of an emulsion or preferably a microemulsion in one of the major components, that is to say in the isocyanate-reactive component and/or the polyisocyanate component. Such emulsions or microemulsions may be prepared using conventional techniques and suitable emulsifying agents.

Emulsifying agents suitable for preparing stable emulsions or microemulsions of fluorinated liquid compounds in organic polyisocyanates and/or isocyanate-reactive compounds include surfactants chosen from the group of nonionic, ionic (anionic or cationic) and amphoteric surfactants. Preferred surfactants for emulsifying the fluorinated liquid compound in the isocyanate-reactive composition are fluoro surfactants and/or alkoxylated alkanes. Preferred surfactants for emulsifying the fluorinated liquid compound in the polyisocyanate composition are non-isocyanate-reactive silicone surfactants.

Organic polyisocyanates which may be used in the method of the present invention include aliphatic, cycloaliphatic, araliphatic and aromatic polyisocyanates but especially the polyisocyanates proposed in literature for use in the production of foams, of particular importance are aromatic diisocyanates such as tolylene and diphenylmethane diisocyanate in the well known pure, modified or crude forms. Special mention may be made of the so-called MDI variants (diphenylmethane diisocyanate modified by the introduction of urethane, allophanate, urea, biuret, carbodiimide, uretonimine or isocyanurate residues) and the mixtures of diphenylmethane diisocyanate(s) and oligomers thereof known in the art as "crude" or "polymeric" MDI (polymethylene polyphenylene polyisocyanates).

The isocyanate-reactive material used in the method of the present invention preferably comprises besides the isocyanate-reactive cyclic blowing promotor also other isocyanate-reactive materials gene rally used in the production of rigid polyurethane foams.

Such isocyanate-reactive compounds generally used in the production of rigid polyurethane foam have a molecular weight of 62 to 1500, an equivalent molecular weight of 31 to 750 and a functionality of 2 to 8, especially 3 to 8 and include polyols, polyamines, polyimines, polyenamines and mixtures thereof.

Polymeric polyols for use in the production of rigid polyurethane foams have been fully described in the prior art and include reaction products of alkylene oxides, for example ethylene oxide and/or propylene oxide, with initiators containing from 3 to 8 active hydrogen atoms per molecule. Suitable initiators include polyols, for example, glycerol, trimethylolpropane, triethanolamine, pentaerythritol, sorbitol and sucrose, and polyamines, for example tolylene diamine, diaminodiphenylmethane and polymethylene polyphenylene polyamines, and aminoalcohols, for example, ethanolamine and diethanolamine, and mixtures of such initiators. Other suitable polymeric polyols include polyesters obtained by the condensation of appropriate proportions of glycols and higher functionality polyols with dicarboxylic acids. Still further suitable polymeric polyols include hydroxyl terminated polythioethers, polyamides, polyesteramides, polycarbonates, polyacetals, polyolefins and polysiloxanes.

Polyamines having a molecular weight below 1000 include aliphatic, cycloaliphatic or araliphatic polyamines containing two or more primary and/or secondary amino groups, such as the low molecular weight amino-ended polyethers, and aromatic polyamines such as DETDA.

In addition to the ingredients already mentioned the foam-forming mixture may contain one or more other auxiliaries or additives conventional to isocyanate-based foam formulations. Such optional additives include further conventional catalysts, fire retardants, smoke suppressants, organic or inorganic fillers, thixotropic agents, dyes, pigments, mould release agents, surfactants, foam stabilisers, cell opening agents and the like.

Isocyanate indices of from 70 to 140 will typically be used in operating the method of the present invention but lower indices may be used if desired. Higher indices, for example 150 to 500 or even up to 3000, may be used in conjunction with trimerisation catalysts to make foams containing isocyanurate linkages.

To reduce the number of component streams delivered to the final mixing apparatus, the cyclic isocyanate-reactive blowing promotor, the catalyst and optionally other additives such as the insoluble organic liquid may be premixed with one of the major components of the foam formulation, in general with the isocyanate-reactive component.

Therefore the present invention also provides an isocyanate-reactive composition comprising a blowing promotor being an isocyanate-reactive cyclic compound of formula:

(I)

wherein
Y is O or $NR^1$ wherein each $R^1$ independently is a lower alkyl radical of $C_1$–$C_6$ or a lower alkyl radical substituted with an isocyanate-reactive group; each R independently is hydrogen, a lower alkyl radical of $C_1$–$C_6$ or $(CH_2)_m$—X wherein X is an isocyanate-reactive group which is OH or $NH_2$ and m is 0, 1 or 2; and
n is 1 or 2;
with the proviso that at least one of $R^1$ or R is or comprises an isocyanate-reactive group;
and an aminoalcohol catalyst.

The method of the present invention may be put into practice making use of conventional techniques. Thus known mixing methods may be used and the foams may be produced in the form of slabstock, mouldings, cavity fillings, sprayed foam, frothed foam or laminates with other materials such as hardboard, plasterboard, paper, plastics or metal.

Rigid polyurethane foams prepared in accordance with the method of the invention are characterised by having open cells (closed cell content below 1%).

They are of particular use for evacuated insulation panel applications where they show superior thermal insulation properties.

Evacuated insulation panels generally comprise a low thermal conductivity filler material (such as open celled polyurethane foam) and a vessel formed of a gastight film enveloping said filler, the whole being evacuated to an internal pressure of about 1–2 mbar or less and then hermetically sealed.

The pressure level to which the vessel must be evacuated in order to obtain a satisfactory insulating property depends on the specific filler material. Also the extent of increase in thermal conductivity with internal pressure increase with lapse of time (owing i.a. to gases such as air and water vapor diffusing gradually) depends on the type of filler material.

General descriptions of the construction of evacuated insulation panels and their use in thermal devices can be found in U.S. Pat. Nos. 5,066,437, 5,032,439 and 5,076,984 and European Patent Publications Nos 434266, 434225 and 181778, all incorporated herein by reference as well as the references mentioned therein.

Preferably the open celled rigid polyurethane foam of the present invention is preconditioned prior to placement in the gastight envelope. This preconditioning involves heating and agitating the filler material preferably under reduced pressure in order to remove contaminants.

To improve the performance of the evacuated insulation panel, materials are provided within the sealed panels to absorb or otherwise interact with gases and vapors that remain due to imperfect evacuation, that permeate the enclosure from the outside atmosphere or evolve from the polyurethane foam filler itself. Such materials are known as getters and may include, for example, activated carbon, molecular sieves and zeolites to adsorb volatiles evolving from the polyurethane foam filler. Other suitable getter materials are described in U.S. Pat. Nos. 4,000,246, 4,444,821, 4,663,551, 4,702,986 and 4,726,974 and in European Patent Publication. Nos 434266 and 181778.

The invention is illustrated but not limited by the following examples in which the following ingredients were used:

Polyol 1: a polyether polyol of OH value 490 mg KOH/g.
Polyol 2: a polyether polyol of OH value 310 mg KOH/g.
Polyol 3: a polyether polyol of OH value 560 mg KOH/g.
Polyol 4: a polyether polyol of OH value 495 mg KOH/g.
Polyol 5: a polyether polyol of OH value 420 mg KOH/g.
PEG 200: polyethyleneglycol of molecular weight 200.
Surfactant: a silicone surfactant.
Cell opener: a cell opening agent.
Fixapret: an isocyanate-reactive cyclic urea available from BASF.
Catalyst LB: a metal carboxylate catalyst available from Imperial Chemical Industries.
Niax A1: a tertiary amine catalyst available from Union Carbide.
Dabco 33LV: a tertiary amine catalyst available from Air Products.
Dabco T45: a metal salt catalyst available from Air Products.
Dabco T: an aminoalcohol catalyst available from Air Products.
Dabco AN20: an azobornane catalyst available from Air Products.
Dabco TMR: a quaternary ammonium salt catalyst available from Air Products.
Dabco 33LV: a tertiary amine catalyst available from Air Products.
Dabco DMEA: an aminoalcohol catalyst available from Air Products.
Thancat ZF 10: an aminoalcohol catalyst available from Huntsman.
Desmorapid P.P.: a piperazine catalyst available from Bayer.
Desmorapid PV: a tertiary amine catalyst available from Bayer.
DMAPA: a tertiary amine catalyst available from BASF.
Polycat 6: a tertiary amine catalyst available from Air Products.
Polycat 15: a metal salt catalyst available from Air Products.
Polycat 17: an aminoalcohol catalyst available from Air Products.
Polycat 41: a triazine catalyst available from Air Products.
Polycat 46: a metal salt catalyst available from Air Products.
Polycat 77: a triazine catalyst available from Air Products.
Texacat ZR70: a tertiary-dimethylamino ether monol catalyst available from Huntsman.
Isocyanate: a polymeric MDI variant.

EXAMPLE 1

Rigid open celled polyurethane foams were made from the ingredients listed below in Table 1.

Reaction profile was followed in terms of cream time and gel time. The following properties were measured on the obtained foams: free rise density (according to DIN 53420 standard) and closed cell content (according to BS 4370 Method 10 standard) representing volume % of closed cells. The results are presented in Table 1.

These results show that using aminoalcohol catalysts according to the present invention (Foam No. 6) yields lower closed cell contents than the metal carboxylate catalysts of the prior art (Foams Nos 1 and 2). Standard amine or triazine catalysts (Foams Nos 3, 4, 5 and 7) cannot be used at all to make open celled rigid polyurethane foams; the closed cell content is above 75%.

Further the base of the foam samples Nos 1 and 2 shows voids whereas the base of foam sample No. 6 is good (without voids).

TABLE 1

| Foam No. | | 1 | 2 | 3 | 4 | 5 | 6 | 7 |
|---|---|---|---|---|---|---|---|---|
| Polyol 1 | pbw | 60.0 | 60.0 | 60.0 | 60.0 | 60.0 | 60.0 | 60.0 |
| Polyol 2 | pbw | 23.9 | 23.9 | 23.9 | 23.9 | 23.9 | 23.9 | 23.9 |
| Polyol 3 | pbw | 10.0 | 10.0 | 10.0 | 10.0 | 10.0 | 10.0 | 10.0 |
| Surfactant | pbw | 2.0 | 2.0 | 2.0 | 2.0 | 2.0 | 2.0 | 2.0 |
| Fixapret | pbw | 3.0 | 3.0 | 3.0 | 3.0 | 3.0 | 3.0 | 3.0 |
| Cell Opener | pbw | 0.5 | 0.5 | 0.5 | 0.5 | 0.5 | 0.5 | 0.5 |
| Catalyst LB | pbw | 1.00 | 0.8 | | | | | |
| Niax A1 | pbw | | 0.2 | | | | | 1.00 |
| Dabco 33LV | pbw | | | 0.8 | | | | |
| Polycat 41 | pbw | | | | 1.0 | | | |
| Polycat 77 | pbw | | | | | 1.0 | | |
| Texacat ZR70 | pbw | | | | | | 1.7 | |
| Isocyanate | pbw | 165 | 165 | 165 | 165 | 165 | 165 | 165 |
| Index | | 110 | 110 | 110 | 110 | 110 | 110 | 110 |
| Cream time | sec | 26 | 23 | 23 | 22 | 23 | 23 | 13 |
| Gel time | sec | 90 | 92 | 88 | 72 | 90 | 89 | 122 |
| Density | kg/m$^3$ | 41.0 | 43.0 | 43.2 | 43.5 | 43.5 | 43.4 | 43.6 |
| Closed Cell Content | % | 1.0 | 0.9 | 90 | 75 | 68 | 0.6 | 85 |

EXAMPLE 2

Rigid open celled polyurethane foams were made from the ingredients listed below in Table 2 and 3 at an index of 110.

The following properties were measured on the obtained foams: free rise density (according to DIN 53420 standard) and closed cell content (CCC) (according to BS 4370 Method 10 standard) representing volume % of closed cells. The cell size and the presence of basal voids was checked visually. The results are presented in Table 3. These results show that all of the co-catalysts give high open cell content when used in combination with Texacat ZR70.

TABLE 2

| Ingredient | Amount (pbw) |
|---|---|
| Polyol 4 | 60 |
| Polyol 5 | 24 |
| PEG 200 | 10 |
| Fixapret | 3 |
| Surfactant | 2 |
| Texacat ZR70 | 1.6 |
| Co-catalyst (see Table 3) | See Table 3 |
| Cell Opener | 0.5 |
| Isocyanate | 167 |

TABLE 3

| Co-catalyst | Foam No. | Amount co-catalyst | CCC (%) | Density (kg/m³) | Basal Voids | Cell Size |
|---|---|---|---|---|---|---|
| Niax A1 | 8 | 0.2 | 0.05 | 62 | No | Fine |
| Dabco T45 | 9 | 0.2 | 1.2 | 47 | Yes | Fine |
| Dabco T45 | 10 | 0.4 | 1.0 | 54 | Yes | Fine |
| Thancat ZF10 | 11 | 0.2 | 0.0 | 62 | No | Fine |
| Thancat ZF10 | 12 | 0.4 | 0.0 | 63 | No | Fine |
| Desmorapid P.P. | 13 | 0.2 | 0.03 | 57 | No | Fine |
| Desmorapid P.P. | 14 | 0.4 | 0.0 | 62 | No | Fine |
| Desmorapid PV | 15 | 0.2 | 0.05 | 62 | No | Fine |
| Desmorapid PV | 16 | 0.4 | 0.0 | 62 | Yes | Fine |
| Dabco T | 17 | 0.2 | 0.0 | 63 | No | Fine |
| Dabco T | 18 | 0.4 | 0.0 | 62 | No | Fine |
| Dabco AN20 | 19 | 0.2 | 0.0 | 64 | No | Fine |
| Dabco AN20 | 20 | 0.4 | 0.0 | 62 | Yes | Fine |
| DMAPA | 21 | 0.2 | 0.0 | 57 | No | Fine |
| DMAPA | 22 | 0.4 | 0.0 | 65 | No | Fine |
| Dabco TMR | 23 | 0.2 | 0.2 | 48 | No | Fine |
| Dabco TMR | 24 | 0.4 | 0.02 | 59 | Yes | Fine |
| Dabco DMEA | 25 | 0.2 | 0.1 | 57 | Yes | Fine |
| Dabco DMEA | 26 | 0.4 | 0.2 | 59 | Yes | Fine |
| Dabco 33LV | 27 | 0.2 | 0.3 | 49 | No | Fine |
| Dabco 33LV | 28 | 0.4 | 0.05 | 60 | No | Fine |
| Polycat 41 | 29 | 0.2 | 0.3 | 58 | Yes | Fine |
| Polycat 41 | 30 | 0.4 | 0.2 | 61 | Yes | Fine |
| Polycat 46 | 31 | 0.2 | 0.4 | 49 | Yes | Fine |
| Polycat 46 | 32 | 0.4 | 1.1 | 56 | Yes | Fine |
| Polycat 6 | 33 | 0.2 | 0.1 | 62 | No | Fine |
| Polycat 6 | 34 | 0.4 | 0.0 | 59 | No | Fine |
| Polycat 77 | 35 | 0.2 | 0.1 | 59 | No | Fine |
| Polycat 77 | 36 | 0.4 | 0.0 | 57 | No | Fine |
| Polycat 17 | 37 | 0.2 | 0.01 | 62 | No | Fine |
| Polycat 17 | 38 | 0.4 | 0.0 | 63 | No | Fine |
| Polycat 15 | 39 | 0.2 | 0.0 | 62 | No | Fine |
| Polycat 15 | 40 | 0.4 | 0.1 | 62 | No | Fine |

I claim:

1. Process for the preparation of rigid foams comprising the step of reacting an organic polyisocyanate with an isocyanate-reactive material in the presence of a blowing promotor being an isocyanate-reactive cyclic compound of formula:

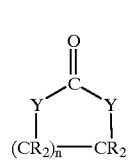

wherein

Y is O or $NR^1$ wherein each $R^1$ independently is a lower alkyl radical of $C_1-C_6$ or a lower alkyl radical substituted with an isocyanate-reactive group;

each R independently is hydrogen, a lower alkyl radical of $C_1-C_6$ or $(CH_2)_m-X$ wherein X is an isocyanate-reactive group which is OH or $NH_2$ and m is 0, 1 or 2; and n is 1 or 2;

with the proviso that at least one of $R^1$ or R is or comprises an isocyanate-reactive group;

characterised in that an aminoalcohol is used as catalyst.

2. Process according to claim 1 wherein the aminoalcohol is a tertiary-dimethylamino ether monol.

3. Process according to claim 2 wherein the aminoalcohol is 2-(2-dimethylaminoethoxy)ethanol.

4. Process according to claim 1, wherein the aminoalcohol is used in an amount ranging from 0.1 to 3% by weight based on total reaction system.

5. Process according to claim 1 wherein the aminoalcohol is used in blocked form.

6. Process according to claim 1 wherein a catalyst of another type is used in addition to the aminoalcohol catalyst in an amount of up to 25 wt % of total catalyst.

7. Process according to claim 1 wherein the isocyanate-reactive cyclic blowing promo or is a cyclic urea of formula

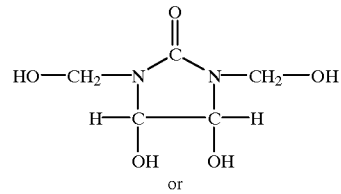

or

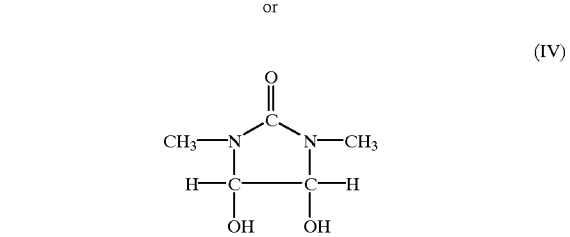

8. Isocyanate-reactive composition comprising a blowing promotor being an isocyanate-reactive cyclic compound of formula:

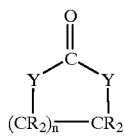 (I)

wherein

Y is O or NR$^1$ wherein each R$^1$ independently is a lower alkyl radical of C$_1$–C$_6$ or a lower alkyl radical substituted with an isocyanate-reactive group;

each R independently is hydrogen, a lower alkyl radical of C$_1$–C$_6$ or (CH$_2$)$_m$—X wherein X is an isocyanate-reactive group which is OH or NH$_2$ and m is 0, 1 or 2; and n is 1 or 2;

with the proviso that at least one of R$^1$ or R is or comprises an isocyanate-reactive group;

and an aminoalcohol catalyst.

9. Composition according to claim 8 wherein the aminoalcohol is a tertiary dimethylamino ether monol.

10. Composition according to claim 8 wherein the amount of aminoalcohol is between 0.05 and 2.5% based on the total isocyanate-reactive composition.

11. Rigid open celled polyurethane foam obtainable by a process as defined in claim 1.

12. Evacuated insulation panel comprising a filler material and a vessel formed of a gastight film enveloping said filler, characterised in that said filler material comprises a rigid open celled polyurethane foam as defined in claim 11.

13. Evacuated insulation panel according to claim 12 wherein said panel also comprises a getter.

\* \* \* \* \*